United States Patent
Wiedemer

(10) Patent No.: US 7,259,880 B1
(45) Date of Patent: Aug. 21, 2007

(54) DEVICE AND METHOD FOR PROCESSING AND PRINTING INFORMATION

(75) Inventor: Manfred Wiedemer, Ismaning (DE)

(73) Assignee: Oce Printing Systems GmbH, Poing (DE)

( * ) Notice: Subject to any disclaimer, the term of this patent is extended or adjusted under 35 U.S.C. 154(b) by 0 days.

(21) Appl. No.: 09/937,845

(22) PCT Filed: Mar. 31, 2000

(86) PCT No.: PCT/EP00/02900

§ 371 (c)(1),
(2), (4) Date: Jan. 28, 2002

(87) PCT Pub. No.: WO00/60446

PCT Pub. Date: Oct. 12, 2000

(30) Foreign Application Priority Data

Apr. 1, 1999 (DE) ................................ 199 15 041

(51) Int. Cl.
*G06K 15/00* (2006.01)
*G06F 7/00* (2006.01)

(52) U.S. Cl. .............................. 358/1.15; 707/3; 707/4

(58) Field of Classification Search ............... 358/401, 358/402, 404, 426.05; 707/3, 102, 4; 705/34
See application file for complete search history.

(56) References Cited

U.S. PATENT DOCUMENTS

| | | | |
|---|---|---|---|
| 5,781,911 A | | 7/1998 | Young et al. |
| 6,505,196 B2 * | | 1/2003 | Drucker et al. .............. 707/5 |
| 6,615,166 B1 * | | 9/2003 | Guheen et al. .............. 703/27 |
| 2002/0122201 A1 * | | 9/2002 | Haraguchi et al. ......... 358/1.15 |
| 2002/0138475 A1 * | | 9/2002 | Lee ............................... 707/3 |
| 2002/0156834 A1 * | | 10/2002 | Kitada et al. ............... 709/203 |
| 2002/0169754 A1 * | | 11/2002 | Mao et al. ................... 707/3 |
| 2003/0002068 A1 * | | 1/2003 | Constantin et al. ......... 358/1.15 |
| 2003/0112460 A1 * | | 6/2003 | Simpson et al. ........... 358/1.15 |
| 2005/0246272 A1 * | | 11/2005 | Kitada et al. ................ 705/40 |

FOREIGN PATENT DOCUMENTS

| | | |
|---|---|---|
| DE | 196 51 788 A1 | 6/1998 |
| WO | WO99/05618 | 2/1999 |

OTHER PUBLICATIONS

"Entwicklung neuer Medien-konzepte für PoD-Dienstleister", Printing- und Binding-on-demand. digital, "Schulungsunterlage Patentinformationssystem DEPATIS Recherche für Prüfer DPA-02".

"Das Patentinformationssystem PATIS Ein Beitrag des Deutschen Patentamts zur Sicherung des Industriestandorts Deutschland", Technisches Konzept.

* cited by examiner

*Primary Examiner*—Jerome Grant, II
(74) *Attorney, Agent, or Firm*—Schiff Hardin LLP

(57) ABSTRACT

The invention relates to a device and a method by means of which personalized printed items can be produced and printed out. The invention permits a user inexperienced in carrying out research to compile information in accordance with personal search criteria. The information found is automatically adjusted to the dimensions of the printed item set by the user so that said user is able to compile a personalized book containing numerous ample passages without first having to familiarize himself with a search algorithm or data bank structures. The invention is designed especially for use in the non-fiction domain since large volumes of scientific data are already stored in electronically readable data banks. Other applications of the invention include the compilation of sample passages from fiction books or the production of a customized travel guide.

23 Claims, 10 Drawing Sheets

| Search Criteria | |
|---|---|
| Title / search terms: | silkscreening |
| Authors: Name: | — not specified — |
| Language: | German / English |
| Publications: | 1960 — 1998 |
| Key words: | Methods, machines, patents |

FIG.6

| Scope of the Print Copy | | |
|---|---|---|
| Table of contents: | ● yes | ○ no |
| List of authors: | ● yes | ○ no |
| Table of publishers / ISBN No.: | ● yes | ○ no |
| Glossary: | ○ yes | ● no |
| List of titles: | ● yes | ○ no |
| Total scope: | max. 500 | pages |
| Number of authors: | max. 20 | |
| Number of publications: | max. 50 | |
| Text contributions: number: | max. 10 | |
| length: | max. 500 | lines |
| Patents: | Title and Owner | |
| Image contents: | Captions only | |

FIG.7

| Design | |
|---|---|
| Format: | A4 duplex |
| Binding: | spiral binding |
| Paper: | 80g/m², white |
| Title Page: | ☑ yes  personalized |

FIG.8

| Billing | |
|---|---|
| Order and shipping address: | Mr. A. Sampleman<br>Example Street 11<br>4711 Sample Town |
| Deilvery date: | 19.09.1998 |
| Cost limit: | DM 100.- |
| Billing: | credit card 12345 |

FIG.9

DEVICE AND METHOD FOR PROCESSING AND PRINTING INFORMATION

BACKGROUND OF THE INVENTION

1. Field of the Invention

The present invention is directed to a device and to a method for processing and printing information.

2. Description of the Related Art

During the course of the progress of information technology, information is being made available in more and more different ways. What is probably the fastest development has been accomplished in the field of electronically stored information. Nonetheless, there continues to be a need to print out information. There is a need to get electronically stored information in a high-performance fashion and to supply the information in printed form to interested parties easily and quickly.

A specific field has been created for this purpose, which is referred to as "Print on Demand" (PoD). In this field, for example, services are offered with which books can be printed at specific print stations in response to an individual order. This method makes it possible that large editions of the books need not be printed and stored centrally and be delivered to the dealers from the central warehouse; rather, the dealer merely receives the information to be printed in the book in electronic form and prints out the information in book form with the dealer's print station. Since the dealer is usually located close to the final consumer, the dealer can offer the consumer an arbitrary book without keeping it in stock and can deliver it a short time later. For example, such a system is described under the title "Entwicklung neuer Medien-Konzepte für PoD-Dienstleister" in the periodical Deutscher Drucker No. 35/98 of 17 Sep. 1998. Such systems also make it possible for the informational content of the books or, respectively, for the corresponding data to be delivered to the print station via the Internet. For example, Xerox Corp. offers a corresponding service under the trademark "Xerox Book in Time".

Compared to conventional publishing and book retailing, the advantages of such PoD systems are that the costs for transporting the books over long distances are avoided and that no costs are incurred for warehousing the books, since the books are printed just-in-time on demand, small editions can be economically published, and the number of books to be printed is independent of the size of the edition, so that an arbitrarily great number of books is printed given a corresponding demand. Moreover, this means faster delivery for the customer since the electronic communication of the respective book content via data networks can ensue in a few minutes. This is particularly true of rarely ordered books.

A software program is known under the trademark HP Web PRINTSMART, whereby information from different Internet web sites can be read out or stored and printed out as a single document with a continuous format. With this program, for example, a user can compile the user's daily paper, which the user fetches via the Internet and prints out on the user's printer. The special characteristic of this program is that web pages that are formatted for display at a picture screen are converted into a format suitable for the printer. This program merely reads information from web pages.

The information stored in the web page usually serves advertising purposes and can thus serve only conditionally as an information source for a specific topic.

There are numerous electronic data banks that can cover general topics are that are specialized for specific fields, particularly occupations. Such data banks are usually only available to limited user circles who have contracted with the vendors of these data banks to the effect that they are allowed to use the data banks in exchange for a corresponding payment.

Even though enormous quantities of information are electronically stored and accessible via data networks, only selected and extremely limited circles have access to such information sources. It is thus hardly possible to get an overview of the electronically stored information for a specific topic of interest for someone who does not have such access to these information sources or who wants to be informed in a field outside that person's specific field.

The German Patent document DE 196 51 788 A1 discloses a method for data determination and editing in information networks such as, for example, the Internet. A targeted, time-saving search for arbitrary information is supposed to be possible with this method. This method is characterized by "intelligent" search engines that, for example, eliminate redundant datasets, abort the search when the number of datasets exceeds a prescribed maximum, or a further search run is implemented when the number of identified relevant datasets is higher than this limit, whereby the user or the search program provides a further relevant search word and a second search run is started. In this method, the individual search passes are interactively implemented, as a result whereof the user respectively intervenes in the search.

The above-mentioned German Patent document DE 196 51 788 A1, further, discloses a training matrix with synonymous descriptors that enable a search for descriptors having the same content after an unsuccessful search. In this method, for example, the user is automatically assisted by automatic suggestions of further search terms (descriptors) in order to carry out an optimally precise search, whereby the given maximum limit of datasets should not be exceeded.

The publication "Das Patent Informationssystem PATIS", by Dr. Volker Hartung and Dr. Klaus Strößner, German Patent and Trademark Office, May 1994, discloses a search system for searching patents that comprises a data network, data terminals such as, for example, search stations, archive computers, and control computers, etc. Given this search system, input masks can be employed for inputting the desired search terms.

Formulation aids for locating search terms for the data bank search with which search terms can be input into corresponding input masks are described in training documents for the patent information system DEPATIS, particularly on pages 51 and 53.

SUMMARY OF THE INVENTION

The present invention is based on the object of providing a device and a method for processing and printing information with which even a user who is inexperienced with respect to data bank queries can get an overview about the electronically stored information for a specific topic, and the corresponding information are made available in the form of a printed copy.

This object and others are achieved by a device for processing and printing information, including one or more information storage devices; at least one search device for searching the information stored in the information storage device or devices; a printer device for printing a printed copy that contains the information identified by the search device, whereby the information storage device or devices, the search device and the printer device are connected to one another via a data network, and the search device comprises a search criterion module for the input of search terms and a print copy scope module for defining the scope of the print copy, so that the search can be implemented according to the criterion of the search terms that have been input and the given scope of the print copy.

In a preferred embodiment, a formatting device is provided for formatting the information identified with the search device for printout at the printer device. The printer device may be fashioned as a printing station in which the formatting device and a printer are integrated. As a further development, the printing station includes an accounting module for billing the usage fees for the use of the information stores. The data network can be the Internet or an intranet. Alternately, the data network is an area network. In a preferred embodiment, at least one of the information stores contains a data bank.

The present invention also provides a method for processing and printing information that comprises the steps of: searching the information at a search station that is connected via a data network to one or more information storage devices; formatting the searched information in a form suitable for a printer device; printing the information at the printer device for produce a printed product, whereby the information stored in the information storage device or in the information storage devices are searched according to the criterion of search terms prescribed by the user as well as according to a scope of the print product defined by the user.

The method may provide that a lower and an upper limit value for the data quantity to be searched is defined according to the criterion of the defined scope of the print product; and the searched data quantity is set such that it lies between the two limit values. Preferably, the lower limit value is approximately 10% through 20% smaller than the upper limit value. Following implementation of the search at the search station, the method may provide that a cost message about the anticipated costs of the print copy is output, whereupon the user can confirm the order. In one development of the invention, the print copy is bound.

The method provides that the scope of the search defined by the scope of the print product is set such that further search results identified after complete exhaustion of the search scope are not taken into consideration. Match criteria of the individual results may be determined in the search event, the match criteria being proportional to the hit precision, whereby the individual results having a low match criterion are not taken into consideration in the compilation of the final search result. Ambiguities of the search terms are automatically excluded in the search event in order to achieve a search with a small data quantity or synonyms of the search terms are taken into consideration for achieving a larger data quantity of the search result. Preferably, following an interrogation of the information stores with the given search terms, the identified search results are sent completely from the information stores to the search station from which the interrogation was generated. Specifically, the search results are evaluated in the search station, i.e. that, for example, their data quantity, the match criteria and the like are identified.

In another embodiment, following the interrogation of the individual information storage devices with the search terms prescribed by the user, the information storage device sends a message to the search station by which the search had been generated, whereby the message contains particular information about the identified data quantity, the anticipated costs and/or a match criterion for the individual results, but the information to be printed is not contained therein. As an additional development, the results are sent to the printer device after an order confirmation.

An input mask that includes a plurality of pairs of fields is displayed at the search station for inputting the search terms, whereby the search criterion can be input in one field of the pairs of fields, and the search term for the input search criterion can be input in the other of the two fields. The fields of the search terms are preferably operated with a logical "and" operation, and at least one further fields is provided with which the logical "and" operation can be modified into a logical "or" operation.

The inventive apparatus for processing and printing information comprises at least one information storage device, a search device for searching the information stored in the information storage device and a printer device that are all connected to one another via a data network, whereby the search device comprises a search criterion module for inputting search terms and a printed copy scope module for determining the scope of the printed copy, so that a search is automatically implemented according to the criterion of the input search terms and of the determined scope of the printed copy.

Since the search device of the inventive apparatus has a search criterion module and a printed copy scope module with which the users defines the search terms and the scope of the print copy to be printed, the search device automatically carries out a search that collects enough information that the printed copy can be printed at the printer device in the predetermined scope.

This is a critical difference from known information search systems or, respectively, search devices, with which a search can in fact also be carried out according to given search criteria, whereby the scope of the search result is respectively defined only by the search criteria input by the user or is limited by a prescribed plurality of partial search results, whereby the scope of the individual partial search results is indefinite. With the known search systems or, respectively, search devices, all corresponding information should be determined insofar as possible according to the criterion of the input search terms, i.e. that as extensive as possible a search result is desired. In an interactive process using dexterous supplementation of the search terms, experienced searchers can reduce the quantity of data determined in this way to a manageable extent, so that the search result can both be evaluated by the party that requested it and a certain demand for completeness is met.

The invention embarks upon a completely different approach, for the inventive apparatus is not intended to carry out a search that meets all demands for exhaustiveness but is intended to enable access to electronically stored information for the user, who is usually not an experienced searcher, to compile this information in a scope and form that can be utilized by the user and to print it as a printed copy, so that the user can interpret the information obtained in a customary way, namely by reading a printed copy that is usually bound to form a booklet or, respectively, book. This simplification as compared to the known search devices is achieved in that the user inputs the search terms into the search criterion module only once and defines the scope of the printed copy at the print copy scope module, and the search devices then independently carry out the search until an amount of information or, respectively, data having the desired scope is present. The definition of the scope of the printed copy means that the data quantity to be searched is fixed independently of the number of individual partial search results. As a result thereof, thus, the total amount of data to be found with a search is defined.

Different methods can be employed for limiting the amount of data. The simplest method is that the search event is aborted after a predetermined amount of data has been obtained.

Another, preferred method is that what is referred to as a match criterion is evaluated, this using a numerical value to indicate the hit precision of the search terms for the individual search results. The coincidence of the search terms with the identified, individual result is all the greater or, respectively, the search terms input by the user are cited all the more frequently in the respective individual result the higher the numerical value of the match criterion is. The individual results with the respectively highest match criterion are then incorporated into the printed copy, and individual results with a lower match criterion are not taken into consideration at all or are not incorporated as text but merely have their title and source incorporated into corresponding lists.

Another method for influencing the information quantity identified that can be automated is that the search device automatically determines whether the data quantity of a preliminary search result is too large or too small for the defined scope of the printed copy, whereby, given too small a data quantity, a further search that delivers a more exhaustive search result is automatically started with synonyms for the search criteria that have been input, and, given too large a data quantity of the preliminary search result, ambiguities of the search criteria are precluded, as a result whereof the data quantity obtained with the search is reduced.

The two latter methods can also be applied combined.

Other methods for influencing the searched informational scope are also possible. It is critical for the invention that information requested by a user according to the user's search criteria and having a predetermined scope are made available in printed form to even a user inexperienced in searching, so that the user can easily interpret them.

With the inventive method for processing and printing information according to for above-described method, the information stored in the information storage device or, respectively, devices are searched and printed out based on the criterion of the search terms prescribed by the user as well as based on the criterion of a scope of the printed product defined by the user.

With the inventive method, as given the above-explained inventive apparatus, the scope of the search result is defined according to the scope of the print copy defined by the user, as a result whereof it is possible—even for a user who is inexperienced in searching—to determine and print out a manageable data quantity with their predetermined search criteria.

BRIEF DESCRIPTION OF THE DRAWINGS

The invention is described in greater detail below on the basis of exemplary embodiments and applied examples and on the basis of the drawings.

FIG. 6 is a view of a display screen showing an input window for inputting the search terms;

FIG. 7 is a view of a display screen showing an input window for inputting the scope of the print copy;

FIG. 8 is a view of a display screen showing an input window for inputting the design of the print copy;

FIG. 9 is a view of a display screen showing an input window for inputting the information needed for accounting.

DETAILED DESCRIPTION OF THE PREFERRED EMBODIMENTS

Figure 1:
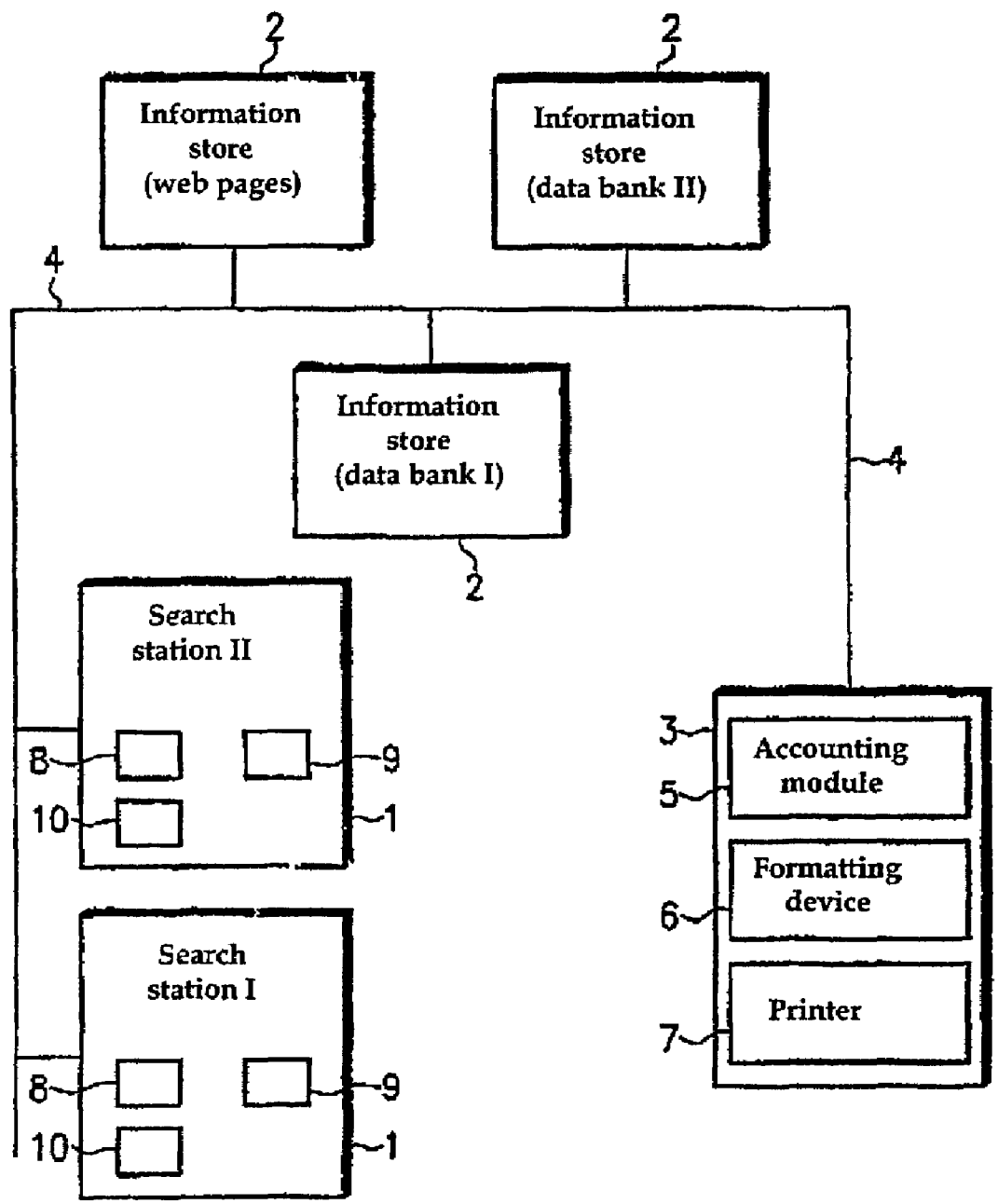
FIG. 1 is a first exemplary embodiment of the apparatus for processing and printing information, shown schematically in a block circuit diagram.

FIG. 1 schematically shows a block circuit diagram of an exemplary embodiment of the inventive apparatus for processing and printing information.

This apparatus comprises two search stations 1, three information stores 2 and a printing station 3. The search stations 1, information stores 2 and the printing station 3 are connected to one another via a data network 4.

The data network 4 can be the Internet, an intranet or, for example, an arbitrary company network (for example, a local area network, LAN, or a wide area network, WAN) to which one or more information stores are connected.

The search stations 1 are usually personal computers connected to the data network 4 on which the search program of the inventive apparatus is installed.

The information stores are data stores connected to the data network 4. They can contain the greatest variety of information such as, for example, web pages and/or data banks. Since web pages are mainly provided for advertising purposes, they are only conditionally suited for gathering information. The informational content of data banks is usually significantly greater. There are data banks that are freely accessible to anyone. Most data banks, however, can only be used after entering into a contract with the respective data bank vendor. For example, such data banks contain scientific articles relating to certain fields, patent information, articles from daily papers or economic data. The data banks that contain articles from daily papers have the advantage over a traditional newspaper that all of the articles published over a longer time span can be searched therein.

The printing station 3 comprises an accounting module 5, a formatting device 6 and a printer 7. Moreover, the printing station 3 can comprise further system components of a PoD system as described in the initially cited article, "Entwicklung neuer Medien-Konzepte für PoD-Dienstleister" in the periodical Deutscher Drucker No. 35/98 of 17 Sep. 1998. The content of this publication is herewith incorporated by reference into the present specification.

The operator of the printing station 3, for example a PoD service vendor, has entered into one or more agreements with the information vendors (data bank vendors) that allow him or, respectively, the customers authorized by the operator of the printing station 3 to use the data banks in the information stores 2. The corresponding usage fees are usually based on the amount of data that has arisen and are forwarded from the operator of the printing station to the information vendors. The operator of the printing station finances these fees by selling the printed copies to the users of the search stations 1. These accounts are handled with the accounting module 5, as explained in greater detail below.

The information incoming to the printing station 3 from the data network 4 are present in the greatest variety of formats (for example, IETF, W3C, PostScript, PDF, MS Word, etc.), particularly when the data network 4 is the Internet, these formats being converted by the formatting device 6 into a format suitable for the printer 7. Further, the formatting device 6 can format the print copy in conformity with the wishes of the user of the search station 1. This is explained in greater detail later. The accounting module 5 and the formatting device 6 can be realized as software modules on a computer integrated in the printing station 3.

For example, a duplex-compatible digital printer is provided as the printer 7; this can be provided with a device for binding the printed copy. The printed copy can, for example, be held together with a spiral binding or a glued binding.

It is critical for the invention that the search station 1 comprises at least one search criterion module 8 and a print copy scope module 9. These two modules 8 and 9 can be realized as computer programs installed at the search stations 1. A user inputs the respective search terms in accord wherewith searching should be carried out in the information stores 2 at the search criterion module 8. The user defines the scope of the print copy with the assistance of the print copy scope module 9, so that the search station can automatically implement a search, whereby the search result thereof has a scope corresponding to the desired print copy. The setting of the scope of the search result is explained in greater detail later.

The search stations 1 preferably comprise further modules such as, for example, a design module 10 with which the user can define the formatting and design of the print copy. These modules 8 through 10 are embedded into the search program installed at the search station 1 that automatically implements the search and the forwarding of the search result to the printing station 3, as explained below on the basis of the flowcharts shown in FIGS. 3 through 5.

Figure 3:
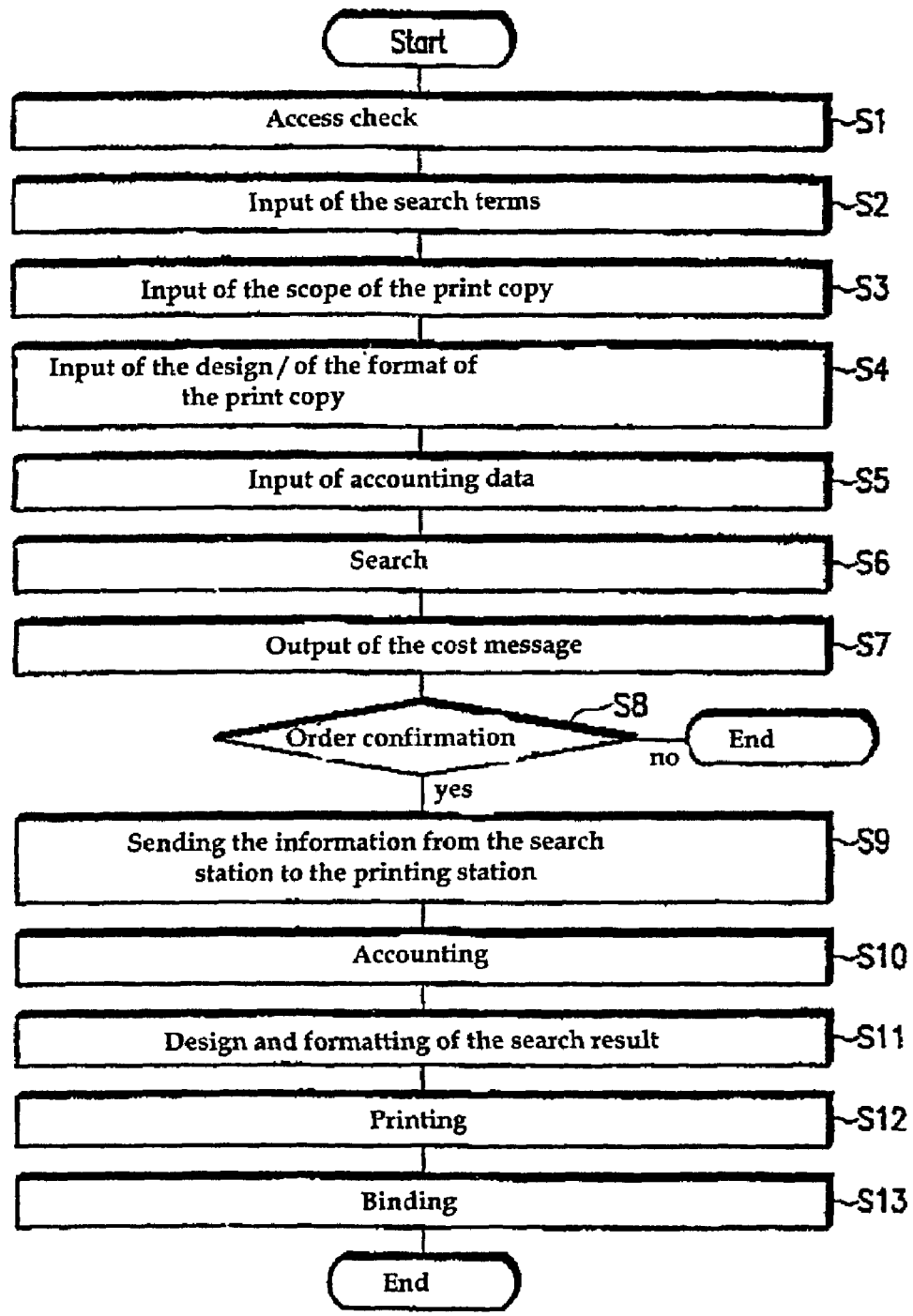
FIG. 3 is a flowchart of the inventive method.

FIG. 3 shows the main program of the search station 1. After the start of the program, an access check is first implemented in a step S1, i.e. the user must input a user identification assigned to the user by the operator of the printing station 3 and, potentially, a password that the user himself has defined with which the user's authorization to use the search station 1 is documented.

After the end of the access check, an input window for inputting the search criteria is displayed at the picture screen of the search station 1. Such an input window is shown by way of example in FIG. 6. The user can input a central title or, respectively, search term in this input window (step S2), this being "silkscreening" in the present example. This means that the user wants more detailed information about the topic "silkscreening".

In addition to this central search term, the user can input an author or, respectively, several authors, the language, the publication time and further rubrics. In the example shown in FIG. 6, the author was not specified, German and English were selected as the languages and 1960 through 1998 was selected as a publication time span. "Methods", "machines", "patents" have been input as further rubrics. These search terms thus define that the user wants German and English publications about the topic "silkscreening" from the 1960 through 1998 that relate to methods, machines and patents.

In the next step S3, the user inputs the scope of the print copy. The scope of the print copy can be defined, on the one hand, by a physical size of the print copy such as, for example, the maximum number of pages. Additionally or alternatively thereto, the scope of the printed copy can also be indirectly determined by defining the individual elements to be printed. For example, the number of text contributions and their length can thereby be defined or it can be indicated whether a table of contents, a list of authors, a list of publishers/ISBN numbers, a glossary, a list of titles, etc., should be recited in the printed catalogue. Further, the user can indicate the way in which special publications such as, for example, patents, are to be incorporated in the print copy or whether image contents are to be presented. Given the input mask shown in FIG. 7, the user has undertaken the following selection: the number of authors is limited to a maximum of twenty; the number of publications is limited to a maximum of fifty; a maximum of ten text contributions with a maximum of 500 lines is to be incorporated; only the titles and owners of patents are to be incorporated and only the captions are to be indicated for images. Further, a table of contents, list of authors, list of publishers and table of titles are to be set up. The overall scope is limited to a maximum of five hundred lines.

In the following step S4, the user inputs the design or, respectively, the format of the print copy. A corresponding input window is shown in FIG. 8. Here, the user can define the format, the binding, the paper and specify whether a title page is to be output and what type of title page is selected. In the present example, the user has selected DIN A4 duplex as the format, spiral binding as the binding and 80 g/m$^2$ white as the paper. Further, a personalized title page is to be output.

The input is ended with the step S5. In step S5, the user inputs accounting-relevant data such as ordering and delivery address, the delivery time, potentially a cost limit and the type of payment. In the present case, the address is Mr. A. Sampleman, Example Street 11, 4711 Sample Town, 19 Sep. 1998 as the delivery time and DM 100 as the cost limit have been input. A payment with a credit card 12345 was selected as the type of payment.

After the end of the input, the program execution switches to the next step S6 with which the search is automatically implemented. A search program that is explained later is thereby started. The search program queries the individual information stores (web pages, data banks, etc.) on the basis of the search terms input by the user in that it sends the search terms input by the user together with a corresponding logical operation (and, or, not) to the individual information stores in a form that can be read by the individual information stores. The information stores 2 search their database after receipt of these search terms and respectively send the individual search results together with a corresponding cost information to the search station 1 that has send the search terms.

In step S7, the data incoming at the search station 1 are interpreted and, given a successful search, i.e. when adequate information have been found, the user receives particular information about the magnitude of the anticipated costs for the print copy. These costs are calculated on the basis of the cost information incoming from the information stores, whereby the costs for producing and delivering the finished print copy are also taken into consideration.

Subsequently, the user can confirm the order in step S8. With the order confirmation, the operator of the printing station 3 is given the order to print and deliver the searched print copy. Since costs are generated with the order confirmation S8, it is expedient to link these to a password, so that it is assured that an unauthorized party cannot give a corresponding print order. When no order confirmation is input or the order confirmation is refused, then the program run is ended.

When the search is not successful, i.e. enough information has not been determined, the message that the search was unsuccessful is output in step S7 instead of a cost message. The user can then input a new search.

When the order is confirmed in step S8, then the searched information are sent from the search station 1 to the printing station 3 via the data network 4 in step S9. These information contain all data to be printed in the print copy and the data necessary for the billing of the print copy such as, for example, ordering party, costs for the use of the information stores, payment mode and the like.

With the step S10, the accountings between the operator of the printing station and the operator of the information stores and the accounting between the operator of the printing station and the user are produced on the basis of the billing data that are transmitted.

Subsequently, the identified search results are formatted and designed in step S11 in the way requested for the print copy. This comprises, first, the generation of lists such as, for example, table of contents, list of authors, etc., the arrangement of the text contributions and the production of a title page, and, second, the conversion of the print formats that the data incoming at the printing station 3 exhibit into a format suitable for the printer 7.

The print copy is printed in step S12 and bound in step S13. The inventive method for processing and printing information has thus been ended, and the printed copy can be delivered to the user or, respectively, to the party that ordered it. In another embodiment of the invention, the book is automatically packaged in a packing station after being bound and is handed over to a shipping system. During packaging, the delivery address input by the user is automatically printed as shipping address.

In a further modification of the invention, the information printed out in the book (or a user-specifically selectable display thereof) can be sent to the user in advance by e-mail, so that the user can get a first impression of the identified information.

Given the applied examples shown in the drawings, the party placing the order receives a book with spiral binding in a duplex method about the topic "silkscreening" that comprises publications from the years 1960 through 1998 in German and English for the rubrics "methods", "machines" and "patents". A maximum of ten text contributions with a maximum length of five hundred lines are printed in the book and a maximum of fifty publications are included. Further, the book contains a table of contents, a list of authors, a list of publishers and a table of title. The reader of this book can thus get an initial overview of the development in the field of silkscreening in the years from 1960 through 1998. Since the text contributions are limited to five hundred lines, they are usually not printed in their complete form. The reader can easily get the complete publication on the basis of the list of publishers in case the reader finds based on the passage presented in the individualized book that this contribution is of interest.

Given the above-described method, the individual results are completed transmitted to the search station 1 in step S6 in the implementation of the search. Given an alternative embodiment, only a message containing the scope of the search result, a corresponding cost information and, potentially, further information characterizing the search result such as, for example, a match criterion can be communicated from the information stores 2 to the search station 1 instead of the complete transmission of the individual results and without transmitting the actual, communicated information. In this modification of the method, the complete information or, respectively, printing information are sent to the printing station 3 directly from the information stores 2 only after the confirmation of the order S8 in the step S9. Given this method, the information stores 2 thus output the complete information only after the order had been confirmed in step S8.

This method is particularly expedient given usage of data banks wherein the fees are due with the issuing of the information since these are only fetched when it has been clearly decided that the print copy is to be printed. The setting of the scope of the search that is to ensue in step S6 to the scope of the printed product defined by the user ensues most simply by not considering the incoming information after the maximum scope of the search or, respectively, the maximum scope for the printed product has been exhausted.

Figure 4:
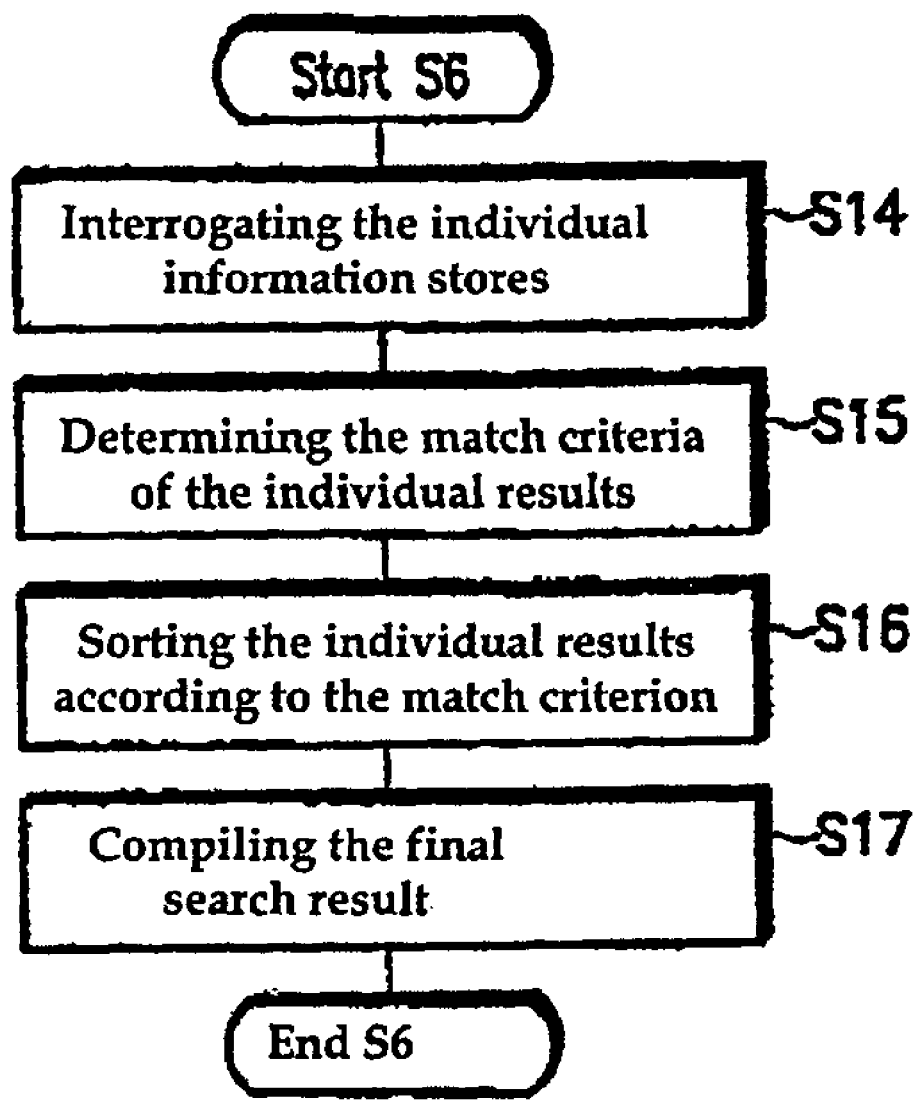
FIG. 4 is a flowchart showing the searching of one embodiment in detail.

Instead of such a simple method, wherein important information are often not taken into consideration, a limitation of the scope of the search can ensue according to the search program shown in FIG. 4. This search program is a sub-program for the main program shown in FIG. 3 that is called in step S6.

With this sub-program, the individual information stores are first interrogated in step S14 according to the search terms input by the user. The individual results returned from the information stores 2 to the search station 1 are evaluated in the step S15, and a "match criterion" of the individual results is defined. The match criterion indicates the hit precision, i.e. the numerical value of the match criterion is proportional to the number of the search terms contained in the individual results or, respectively, proportional to the number of the frequency of occurrence of the search terms in the individual results.

The individual results are sorted according to the match criterion in the step S16. The final search result is compiled in the step S17, whereby the individual results with the best match criterion are selected until the scope of the search prescribed by the defined scope of the print copy has been completely exhausted. The final search result thus contains the individual results that match best with the given search terms. As a result thereof, only the less applicable individual results are eliminated, and the more applicable individual results are printed out in the print copy.

Figure 5:
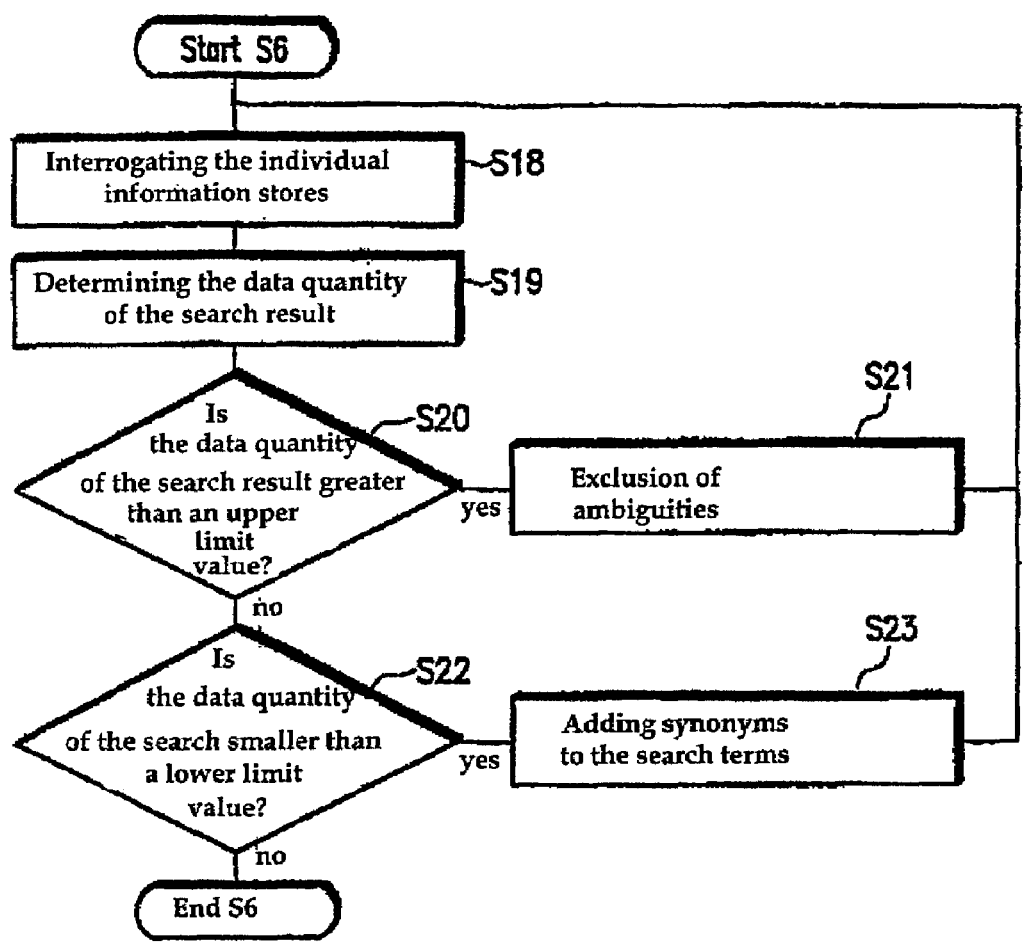
FIG. 5 is a flowchart showing the searching of a further embodiment in detail.

FIG. 5 shows a further flowchart of a search program that can be executed instead of or in combination with the search program shown in FIG. 4. This search program is in turn called as sub-program in the step S6 of the main program. First, the individual information stores are again interrogated in step S18 for the search terms provided by the user. The size, i.e. the amount of data, of all individual results identified in step S18 is determined in step S19.

A determination is made in step S20 whether the identified amount of data is greater than an upper limit value of the search scope. The upper limit value of the search scope derives from the defined scope of the print copy. When the amount of data of the identified search results is greater than the upper limit value, then the program run switches to the step S21, with which ambiguities in the search terms are precluded. When, for example, one of the search terms is "bank", then this search term can be linked to further terms typical of "financial service providers", so that it is assured that the search result does not contain any "bank" in the sense of a river bank or the like. The information stores are interrogated again with the search terms modified in this way, i.e. the program execution goes back to step S18.

When it is found in the determination as to whether the amount of data of the search results identified in the search is not greater than the upper limit value, then the program execution switches to the step S22, wherein a query is made as to whether the amount of data of the search results is smaller than a lower limit of the search scope defined by the scope of the print copy. When it is found in the query in step S22 that the amount of data of the search results is smaller than this lower limit value, then the program execution switches to the step S23, wherein synonyms are added to the search terms. As a result thereof, the number of search terms is expanded and the entire search is placed on a broader base. The information stores are interrogated again with these expanded search terms, i.e. the program run returns to the step S18.

When it is found in step S22 that the amount of data of the search result is greater than the lower limit value for the search scope determined by the defined scope of the printed copy, this means that the amount of data of the search result lies in the desired range, so that this search program is ended.

Due to the exclusion of ambiguities in step 21, individual results of a search can be eliminated, as a result whereof the scope of the search decreases. Due to the addition of synonyms to the search terms, further, desired individual results can be determined, as a result whereof the amount of data of the search result is increased. As a result thereof, the search result can be automatically set to a desired quantity of data. Preferably, the limit values applied in steps S20 and S22 cover a specific range, whereby the lower limit value of the step S22, for example, is 10% lower than the upper limit value of the step S20.

The search programs shown in FIGS. 4 and 5 substantially enhance the quality of the search without a necessity of the user interactively intervening in the search. The only interaction that the user must carry out is to confirm the order in step S8. As a result thereof, it is possible for even a user who is inexperienced in searching to implement a search with appealing quality in different information stores, particularly in different data banks, whereby the search result is output at the same time as a print copy in a form that is surveyable and can be easily interpreted by the user. For this purpose, the user needs neither general experience in searching nor knowledge of the individual data banks as needed given a manual search. The inventive method thus simply allows a compilation of individualized information and printing of this information to form a print copy such as, for example, a perfect-bound book.

The inventive method and the inventive apparatus are preferably applied for producing individualized books with specialized subject matters, since an extensive database is already stored therefor and can be fetched via data networks.

The invention, however, is not limited to this application; rather, extracts, for example from belles lettres, can be individually compiled and printed.

Another area of employment is, for example, the compilation of an individualized travel guide. Such a travel guide can be produced, for example, in that the destination area is input as main search term in the search criteria and the corresponding interests such as, for example, in the areas of culture, sports, etc., are input as further rubrics. It can be expedient in the compilation of such a travel guide that a query possibility for what are referred to as "one-time" information is created in the search criteria, i.e. for example information that are requested only once such as, for example, a map of the travel destination. The multiple printing of these information, even when they derive from different information stores, is usually undesired since, for example, the user needs only one map. Further typical one-time information are, for example, a list of physical characteristics or a standard table.

Figure 2:
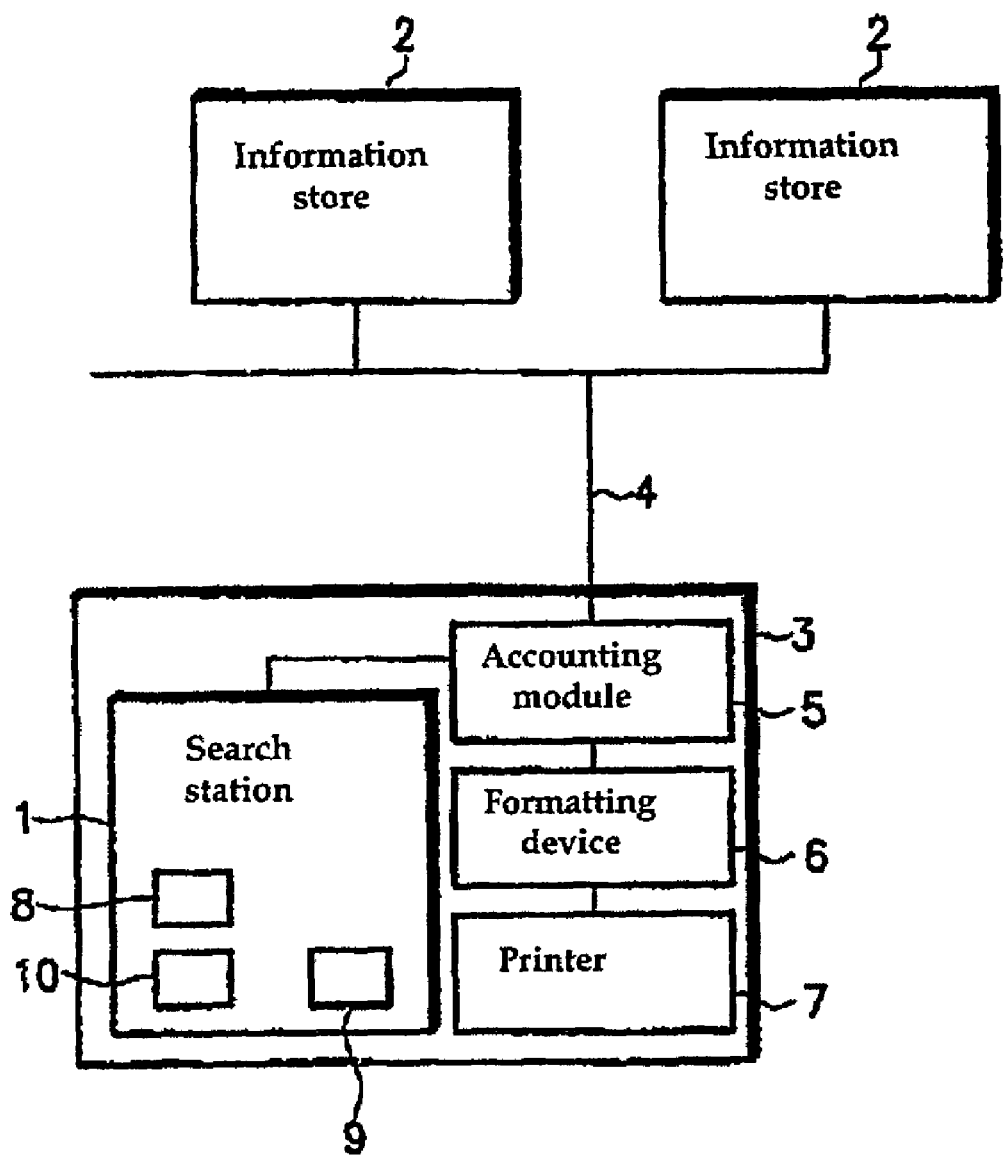
FIG. 2 is a second embodiment of the inventive apparatus for processing and printing information, shown schematically in a block circuit diagram.

The invention is not limited to the above-described exemplary embodiments. Within the scope of the invention, for example, it is possible to provide a single search station 1 that is arranged in the printing station 3 (FIG. 2). Such an arrangement is expedient when the operator of the printing station implements the search as a service for his customers at the same time, i.e. makes the inputs that are necessary for the implementation of the search.

Figure 10:
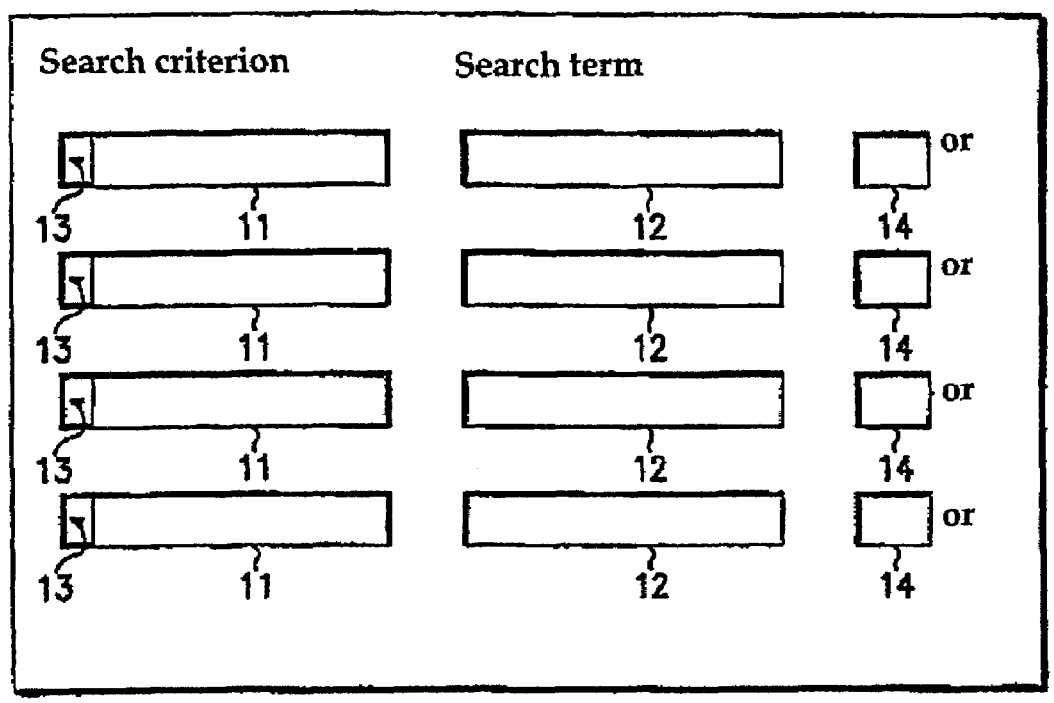
FIG. 10 is a view of a display screen showing an input window for inputting the search terms in conformity with another embodiment.

The invention is also not limited to the input masks shown in FIGS. 6 through 9. FIG. 10, for example, shows a further input mask for the input of the search criteria and search terms. This input mask comprises fields 11 for search criteria and fields 12 for search terms. Respectively one field 11 for a search criterion is allocated to a field for a search term. Given the input mask shown in FIG. 10, respectively four fields 11 for search criteria and four fields for search terms 12 are provided. Triangular pointers with which lists of the possible search criteria can be called are provided at the left edge of the fields 11 for the search criteria. These lists of search criteria comprise, for example, the search criteria of title, central search term, author, language, publication date, key words, etc. The search criteria can thus be defined with the fields 11, the individual search terms then being input therefor in the fields 12. The search terms input into the fields 12 are fundamentally operated with a logical "and". Sometimes, however, it can be expedient to operate two or more search terms with a logical "or". A further field 14 is provided for this purpose, the number of the other search term with which the respective search term is to be operated with an "or" being entered thereinto. This type of input mask is very flexible and can be utilized in all applied examples of the present invention. It is thereby clear that other known logical operations such as, for example, "NEAR" are also employable.

The description of program modules that a person skilled in the art obviously knows must be present has been omitted from the above description of the inventive exemplary embodiments, for example a program module that sets up the connection between the data network 4 and the individual stations 1 through 3.

The areas of employment of the present invention can be modified in a great variety of ways. Thus, for example, it is possible that the inventively produced, individualized printed products are financed by inserting advertising into the printed copy. For example, blank pages or blank columns can be automatically added to the printed text for personal notes.

Instead of or in addition to the above-described search criteria (see, for example, FIG. 6), other search criteria can also be offered and selected, for example the type of publication such as news, business reports, studies, scientific publications, conference reports, newspaper articles, books, brochures, published patent applications (A), letters patent (C) and/or other suitable kinds of publication. It can also be provided that successive searches of one and the same user are interpreted by the search device or, respectively, by the search program (software), and that the operator is provided with instructions for formatting the search inquiry. A simple example of such support is the storing of all earlier search profiles and the offering of these earlier profiles given a new search. The support can go so far that the search program interactively queries the search criteria from the user, whereby further queries ensue dependent on an input. When, for example, the type of literature "patent publication" is sought, then an interactive query can be carried out as to whether the search is for "granted patents", for "published patent applications" or "unspecified".

The inventive method can, further, be supported by a search expert system that in turn comprises an autonomous program (software) as well as a special data bank. In particular, the expert system can be utilized for the exclusion of the ambiguities (step S21) described in FIG. 5. When banks in the sense of financial services providers are asked for in the above-described example, then the expert system consults typical financial expressions such as "money", "stock exchange", "stock share". When a publication contains at least one of the stored, typical concepts, then the publication is selected; otherwise, it is rejected.

Further logical reviews of the articles can ensue in addition to such topic-specific terms deposited in the expert system; for example, the expert system can automatically select certain information stores (data banks) that are deposited as relevant for the aggregate topic that has been optimally input by the user (for example, financial services or travel or electronics or mechanical engineering).

The described software programs of the invention can be stored on known data carriers such as diskettes, magnetic tapes, CD ROMs, ROM memories, EPROM memories or the like or, as datafiles, can be rerecorded from such stores, for example from a hard disk, onto a different storage medium via a data network (for example, via the Internet).

The invention can be summarized in brief as follows: It is directed to an apparatus and to a method with which individualized printed products can be generated and printed.

The invention allows a person inexperienced in searching to compile information according to personal search terms, whereby the amount of information thereby determined is automatically adapted to the scope of the printed product previously defined by the user. Without being confronted in detail with a search algorithm or data bank structures, the user can thus compile a personal book with a plurality of extracts.

The invention is particularly provided for application in the field of books having specialized subject matters since a broad spectrum of scientific data are already stored in electronically readable data banks. Further applications of the invention are the compilation of extracts in the field of belles lettres or the generation of a personal travel guide.

Although other modifications and changes may be suggested by those skilled in the art, it is the intention of the inventors to embody within the patent warranted hereon all changes and modifications as reasonably and properly come within the scope of their contribution to the art.

The invention claimed is:

1. A device for processing and printing information, comprising:
   at least one information storage device in which is stored information;
   at least one search device for searching the information stored in said at least one information storage device;
   a printer device for printing a printed copy that contains the information identified by the search device;
   a data network connecting said at least one information storage device and said at least one search device and said printer device to one another;
   said at least one search device includes a search criterion module having an input for search terms and a print copy scope module for defining a scope of print copy so that a search is implemented according to a criterion of search terms that have been input and a given scope of print copy.

2. A device as claimed in claim 1, further comprising:
   a formatting device connected to format information identified with said at least one search device for printout at said printer device.

3. A device as claimed in claim 2, wherein said printer device is a printing station in which said formatting device and a printer are integrated.

4. A device as claimed in claim 3, wherein said printing station includes an accounting module for billing usage fees for use of said at least one information storage device.

5. A device as claimed in claim 1, wherein said data network is one of the Internet or an intranet.

6. A device as claimed in claim 1, wherein said data network is an area network.

7. A device as claimed in claim 1, wherein said at least one information storage device includes a data bank.

8. A method for processing and printing information, comprising the steps of:
   searching information at a search station that is connected via a data network to at least one information storage device, said searching step searching the information in said information storage device according to a criterion of search terms prescribed by a user as well as according to a scope of a printed product defined by the user;
   formatting the information searched in said searching step in a form suitable for a printer device; and
   printing the information at the printer device to produce a printed product.

9. A method as claimed in claim 8, further comprising the step of:
   defining a lower and an upper limit value for a data quantity to be searched according to a criterion of a defined scope of the printed product; and
   setting a searched data quantity such that it lies between said lower and upper limit values.

10. A method as claimed in claim 9, wherein said lower limit value is approximately 10% through 20% smaller than said upper limit value.

11. A method as claimed in claim 8, further comprising the steps of:
    outputting a message of an anticipated cost of a printed copy order following implementation of the search at the search station; and
    receiving a confirmation from a user of said printed copy order.

12. A method as claimed in claims 8, further comprising the step of:
    binding said printed copy.

13. A method as claimed in claim 8, further comprising the step of:
    disregarding search results which are beyond a scope defined for the printed product after complete exhaustion of the search.

14. A method as claimed in claim 8, further comprising the step of:
    determining a match criteria of individual results in a search event, said match criteria being proportional to a hit precision; and
    disregarding the individual results having a low match criterion in a compilation of a final search result.

15. A method as claimed in claim 8, further comprising the step of:
    automatically excluding ambiguities of search terms in a search event in order to achieve a search with a small data quantity.

16. A method as claimed in claim 8, further comprising the step of:
considering synonyms of search terms for achieving a larger data quantity of the search result.

17. A method as claimed in claim 16, further comprising the steps of:
evaluating the search results in the search station.

18. A method as claimed in claim 17, wherein said evaluating step includes identifying data quantity and match criteria.

19. A method as claimed in claim 8, further comprising the step of:
sending identified search results completely from said at least one information storage device to said search station from which an interrogation was generated following an interrogation of said information storage devices with given search terms.

20. A method as claimed in claims 8, further comprising the steps of:
sending a message to said search station from said information storage device by which the search had been generated following interrogation of the individual information storage devices with the search terms prescribed by the user, the message contains a particular about at least one of identified data quantity, anticipated costs and a match criterion for the individual results, but the information to be printed are not contained therein.

21. A method as claimed in claim 20, further comprising the step of:
sending print information directly from said information storage device to said printer device after an order confirmation has been placed.

22. A method as claimed in claim 8, further comprising the step of:
displaying an input mask that includes a plurality of pairs of fields at the search station for inputting the search terms;
accepting the search criterion as input in one field of the pairs of fields and a search term for an input search criterion as input in another of the two fields.

23. A method as claimed in claim 22, wherein the fields of the search terms are fundamentally operated with a logical "and" operation, and at least one further field is provided with which the logical "and" operation can be modified into a logical "or" operation.

* * * * *